United States Patent [19]
Toshima et al.

[11] Patent Number: 5,613,714
[45] Date of Patent: Mar. 25, 1997

[54] SEPARATION-PREVENTIVE PIPE JOINT

[75] Inventors: Toshio Toshima; Takahiro Ishihara; Takashi Yokomizo, all of Amagasaki, Japan

[73] Assignee: Kubota Corporation, Osaka, Japan

[21] Appl. No.: 615,894

[22] Filed: Mar. 14, 1996

[51] Int. Cl.$^6$ .................................................. F16L 35/00
[52] U.S. Cl. ............................ 285/39; 285/321; 285/374; 285/404; 285/906
[58] Field of Search ..................................... 285/374, 321, 285/403, 404, 906, 39

[56] References Cited

U.S. PATENT DOCUMENTS

| | | | |
|---|---|---|---|
| 2,398,399 | 4/1946 | Alexander | 285/374 X |
| 3,345,085 | 10/1967 | Hones | 285/374 X |
| 4,296,953 | 10/1981 | Nagao et al. | 285/321 X |
| 4,830,408 | 5/1989 | Reimert | 285/321 X |
| 5,037,144 | 8/1991 | Peting et al. | 285/321 |

FOREIGN PATENT DOCUMENTS 2286334  4/1976  France .................................. 285/321

Primary Examiner—Dave W. Arola
Attorney, Agent, or Firm—Barnes, Kisselle, Raisch, Choate, Whittemore & Hulbert, P.C.

[57] ABSTRACT

A separation preventive pipe joint is provided. A locking ring provided on an inner periphery of a socket is engaged with a projection formed on an outer periphery of an end portion of a spigot to prevent the spigot from being separated from the socket. When the spigot is to move deeper in the socket, a sleeve provided inside the socket abuts the end of the spigot to prevent the movement of the spigot. The movement of the spigot may otherwise be prevented by locating a deeper end face of the socket adjacent to the projection of the spigot. The projection fills up a clearance between the outer periphery of the spigot and the inner periphery of an open end portion of the socket, thereby preventing the spigot and the socket from bending relative to each other. The clearance may otherwise be filled up by means of a ring disposed on the inner periphery of the socket and bolts to be screwed into the socket from the outer periphery thereof to press the ring against the outer periphery of the spigot.

13 Claims, 13 Drawing Sheets

SEPARATION-PREVENTIVE PIPE JOINT

FIELD OF THE INVENTION

The present invention relates to a separation-preventive pipe joint.

BACKGROUND OF THE INVENTION

Slip-on type pipe joints are one type of pipe joints. The slip-on type pipe joints are such that a spigot formed in an end portion of one of two pipes to be joined together is adapted to be inserted into a socket formed in an end portion of the other pipe and provided with a seal packing therein while compressing the seal packing. By virtue of this feature, it is possible to join the socket and the spigot together and to ensure sealing between the socket and the spigot by means of the seal packing.

A slip-on type pipe joint imparted with separation-preventive capability is known in which a locking ring is received in the locking ring receiving groove formed in the inner periphery of the socket and a projection is formed on the outer periphery of an end portion of the spigot to be inserted into the socket so as to engage the locking ring thereby preventing the spigot from being separated from the socket. In such a separation-preventive pipe joint, the locking ring is temporarily enlarged by the end portion of the spigot with its inclined surface serving as a guide upon insertion of the spigot into the socket, so that the projection can pass through the locking ring toward the deeper side of the socket.

In this type of separation-preventive pipe joint, the open end portion of the socket is formed as having a relatively large inner diameter to permit the projection on the end portion of the spigot to pass therethrough. Consequently, when the joining of the joint is completed, a clearance to a certain extent is formed between the inner periphery of the open end portion of the socket and the outer periphery of the spigot. This clearance enables the pipe joint to be imparted with a bendability between the socket and the spigot.

By providing a predetermined distance from the end of the spigot to the deeper end of the socket, when the projection is engaged with the locking ring and inserting the end of the spigot to a position slightly deeper than the location of the locking ring, it is possible to impart an expansibility between the socket and spigot.

Where a pipe line is to be constructed using pipe joints of this type, it is desirable that pipe joints for use in a straight portion of the pipe line be made expansible and bendable as above so as to accommodate themselves to external forces to be exerted thereon. In portions of the pipe line liable to receive nonuniform forces such as curved pipe portions, however, pipe joints subjected to expansion or bending cannot maintain a satisfactory joined condition.

In this case, particularly where a pipe joint is to provide for an interconnection between a straight pipe portion and a curved pipe portion, a socket of the normal type permitting expansion and bending is used as the socket for the straight pipe portion, so flint inconveniences may result when it is joined with the spigot for the curved pipe portion.

To eliminate such inconveniences, there is a proposal that a cylindrical sleeve is interposed between the end of the spigot and the deeper end of the socket in a pipe joint. The presence of the sleeve prevents the spigot from moving along the pipe axis, thereby preventing expansion and retraction of the pipe joint.

However, with mere provision of the sleeve, the problem of bending cannot be satisfactorily solved, though expansion and retraction of the pipe joint are prevented.

SUMMARY OF THE INVENTION

It is, therefore, an object of the present invention to overcome the foregoing problem and to prevent the bending of a pipe joint by means of a simplified structure.

To attain this object, the present invention provides a separation-preventive pipe joint for joining a pair of pipes together, comprising: a socket formed in an end portion of one of the pipes; a spigot formed in an end portion of the other pipe; a locking ring receiving groove formed in an inner periphery of the socket; a locking ring received in the locking ring receiving groove; a projection formed on an outer periphery of an end portion of the spigot for preventing the spigot from being separated from the socket by engaging the locking ring; means disposed inside the socket for preventing the projection from moving toward a position in the socket deeper than a position at which the projection is engageable with the locking ring by abutting the end portion of the spigot; and means for preventing the spigot and the socket from bending relative to each other by filling up a clearance between an outer peripheral surface of the spigot and an inner peripheral surface of an open end portion of the socket.

With such an arrangement, the bend-preventive means fills up the clearance between the outer peripheral surface of the spigot and the inner peripheral surface of the socket to minimize the allowance for bending the socket and the spigot relative to each other, so that any substantial bending of the joint never occurs even when external forces are exerted to the joint.

The foregoing and other objects, features and attendant advantages will become apparent from the following detailed description.

DESCRIPTION OF THE PREFERRED EMBODIMENTS

The present invention will now be described in detail with reference to the drawings.

Figure 1:
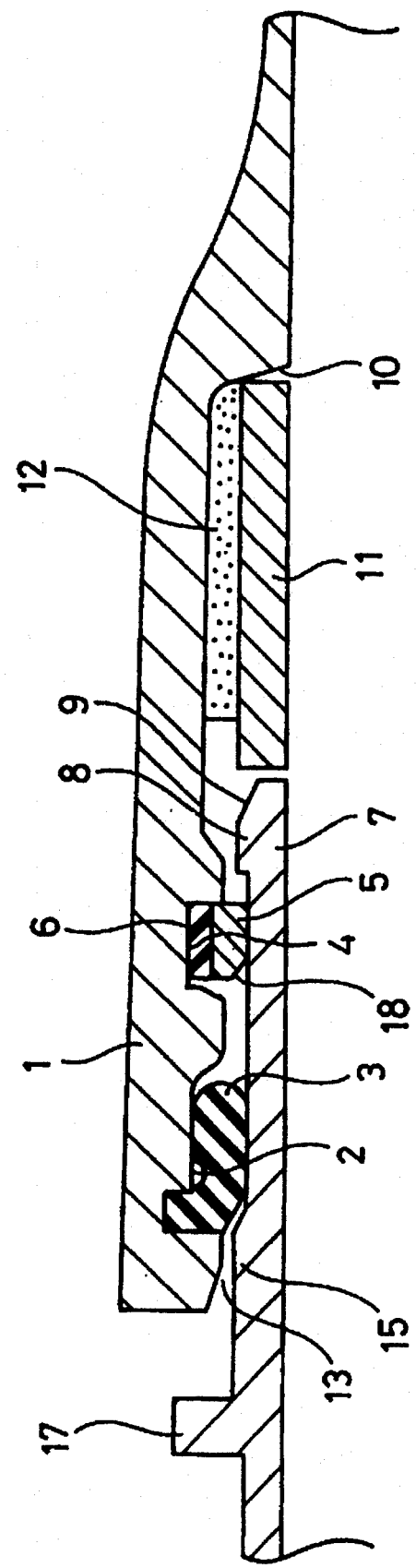
FIG. 1 is a longitudinal sectional view illustrating a separation-preventive pipe joint according to a first embodiment of the present invention.

A first embodiment of the present invention is shown in FIGS. 1 to 6. FIG. 1 illustrates a pipe joint according to the present invention which is applied to a joint portion between a straight pipe portion and a curved pipe portion in a pipe line, wherein reference numeral 1 denotes a socket of a pipe forming the straight pipe portion and reference numeral 2 denotes a spigot of a pipe forming the curved pipe portion. A seal packing receiving groove 2 is formed in an inner peripheral portion of the socket 1 which is located deeper than an open end portion 13 of the socket 1. This groove 2 receives therein an annular seal packing 3 formed of rubber. A locking ring receiving groove 4 is formed in an inner peripheral portion of the socket 1 which is located deeper than the seal packing receiving groove 2. A locking ring 5 formed of a metal and having one split in the circumference thereof is received in the locking ring receiving groove 4. On the inner periphery of the locking ring 5 is formed a tapered surface 18. Between the outer periphery of the locking ring 5 and the inner periphery of the locking ring receiving groove 4 is interposed a rubber ring 6 for centering the locking ring 5. A projection 8, which is engageable with the locking ring 5 from a location deeper than the locking ring 5 in the socket 1, is formed on the outer periphery of the end portion of the spigot 7. This projection 8 has a forwardly narrowing tapered surface 9 in an outer peripheral portion thereof.

Between a deeper end face 10 of the socket 1 and the end of the spigot 7 is disposed a ring sleeve 11 of a metal. An annular rubber member 12 is disposed on the outer periphery of the sleeve 11 for the centering the sleeve 11.

Figure 2:
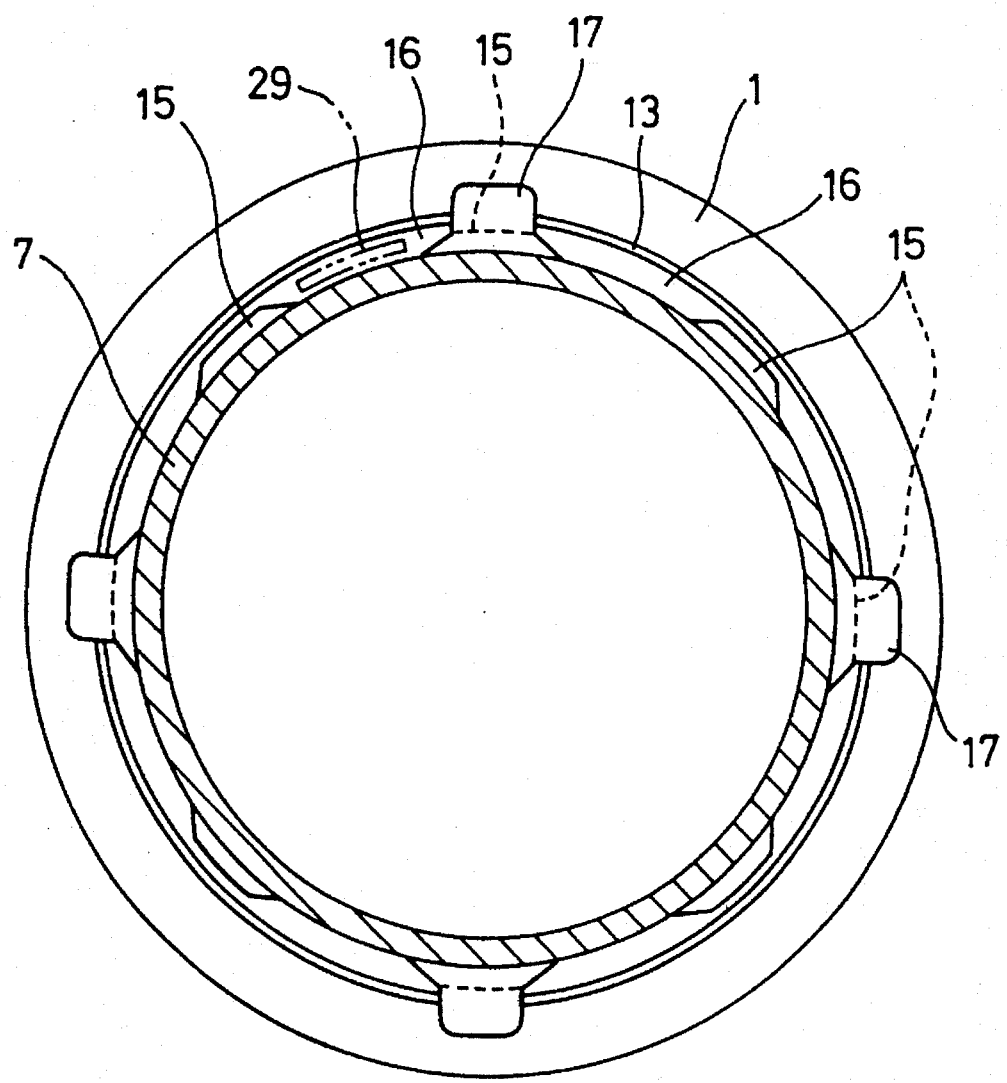
FIG. 2 is a cross sectional view of the separation-preventive pipe joint shown in FIG. 1.

Bend-preventive projections 15 are formed in an outer peripheral portion of the spigot 7 which are located closer to the open end of the socket 1 than the seal packing 3. These bend-preventive projections 15 face opposite the inner periphery of the open end portion 13 of the socket 1 and fill up the clearance between the socket 1 and the spigot 7 when the projection 8 of the spigot 7 is positioned deeper in the socket 1 than the locking ring 5 and adjacent to the sleeve 11 as shown in FIG. 1. The bend-preventive projections 15 are formed in a circumferentially separated state, with a clearance 16 formed between each circumferentially adjacent pair of projections 15 as shown in FIG. 2. In the embodiment shown, the projections 15 comprise eight projections circumferentially equidistantly spaced.

A plurality of stoppers 17 radially outwardly projecting beyond the bend-preventive projections 15 are circumferentially formed on the outer peripheral portion of the spigot 7 in positions spaced away from the end face of the socket 1. In this embodiment, four stoppers 17 are each located at a position corresponding to every other projection 15. The projections 15 extend beyond the open end portion 13 of the socket 1 to a location at which the stopper 17 is present.

When the socket 1 and the spigot 7 are to be joined together, the rubber member 12 for centering is first fitted into the deeper portion of the socket 1, and then the sleeve 11 is disposed within the inner periphery of the rubber member 12. Subsequently, the rubber ring 6 for centering is fitted in the locking ring receiving groove 4, and then the locking ring 5 is disposed within the inner periphery of the rubber ring 6. Alternatively, the locking ring 5 with the rubber ring 6 bonded onto the outer periphery thereof may be fitted into the receiving groove 4. The seal packing 3 is then fitted into the seal packing receiving groove 2.

Figure 3:
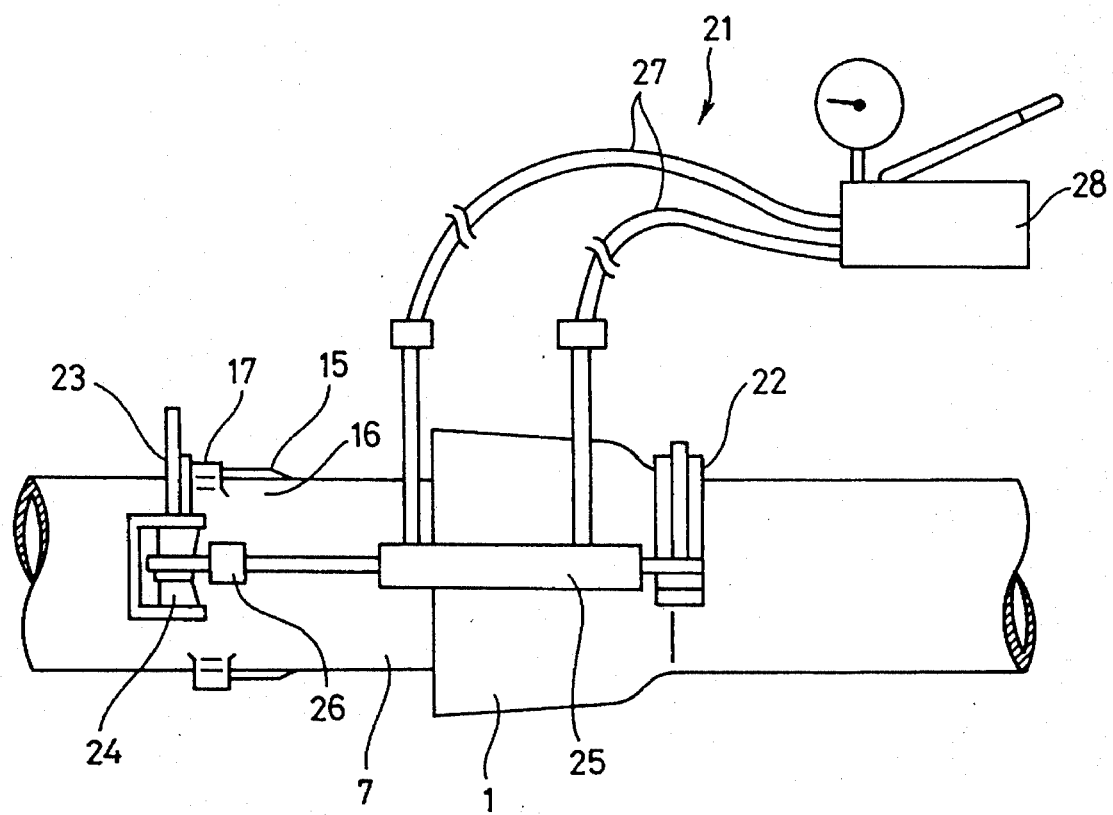
FIG. 3 is a front elevational view illustrating a joining device for use with the separation-preventive pipe joint.

When the socket 1 is in tiffs state, the spigot 7 is allowed to approach the socket 1, and then the spigot 7 and the socket 1 are joined together by using a joining device 21 as shown in FIG. 3. Specifically, a saddle-like socket ring 22 is engaged with the neck portion of the socket 1 from above, and a saddle-like spigot clamp 23 is engaged with the apex portion of the spigot 7 so as to engage a side portion of stopper 17 which is farther from the end face of the socket 1. The spigot clamp 23 is provided with an eccentric roller 24 to which the expansible end side of a cylinder device 25 is connected through a crevice 26 with the base end side of the cylinder device 25 being connected to the socket ring 22. Opposite ends of the cylinder device 25 are respectively connected hydraulic tubes 27 which are connected to a manually operated pump 28.

When the setting of the joining device 21 is completed as shown in FIG. 3, the manually operated pump 28 is actuated to cause the cylinder device 25 to retract. In response thereto, the spigot clamp 23 engages the stopper 17, while at the same time the eccentric roller 24 is rotated by the retraction force of the cylinder device 25 so as to be tightly attached onto the outer periphery of the spigot 7. Further retraction of the cylinder device 25 causes the spigot 7 to be inserted into the socket 1 from the open end portion 13. At this time, the spigot 7 is first forced into the seal packing 3 by the guide of its tapered surface 9, whereby the seal packing 3 is compressed between the outer periphery of the spigot 7 and the inner periphery of the receiving groove 2 of the socket 1 to ensure sealing between the socket 1 and the spigot 7. Further, the ring 6 for centering retains the locking ring 5 without any eccentricity. When the spigot 7 is forced into the inner periphery of the locking ring 5 in/his state, the diameter of the locking ring 5 is resiliently enlarged by the tapered surfaces 9 and 18. When the spigot 7 is further forced into the socket 1, the projection 8 passes through the locking ring 5. Thereafter, the locking ring 5 resumes its initial diameter so as to be assuredly fitted around the outer periphery of the spigot 7. For this reason, even when the spigot 7 is to move away from the socket 1, the projection 8 engages the deeper side of the locking ring 5, thus ensuring the separation preventive function.

Since the end of the spigot 7 is positioned adjacent the end face of the sleeve 11 as shown in FIG. 1, relative movement between the socket 1 and the spigot 7 is restrained, thereby minimizing the expansion-retraction amount of the socket 1 and spigot 7.

Thus, the joining operation for the joint is completed, and then the joining device 21 is removed from the joint, so that the joint assumes the state shown in FIG. 1.

Figure 4:
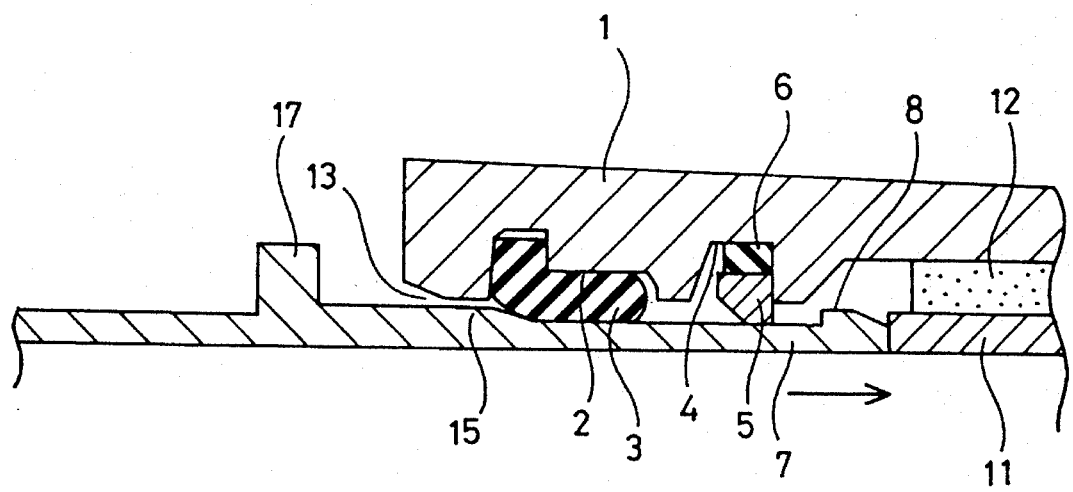
FIG. 4 is a longitudinal sectional view of the separation-preventive pipe joint in a state where the spigot assumes its deepest position in the socket.
Figure 5:
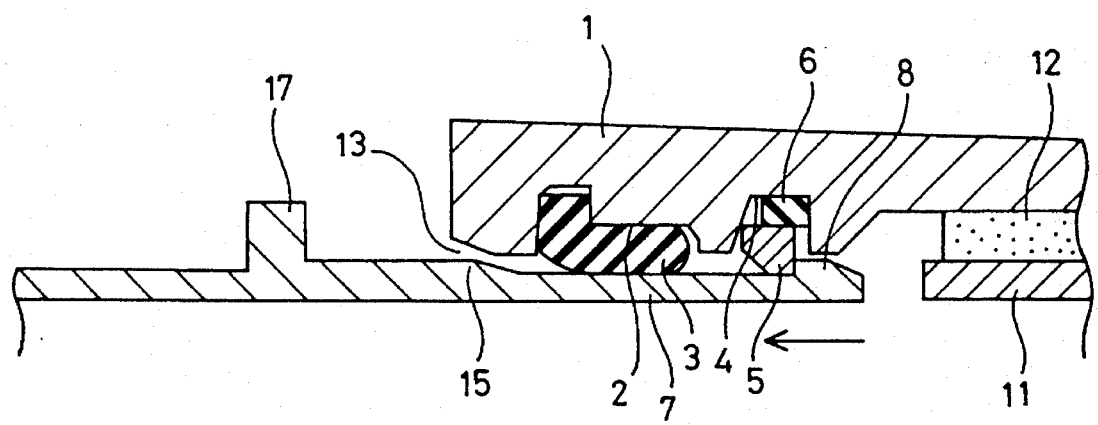
FIG. 5 is a longitudinal sectional view of the separation-preventive pipe joint in a state where the spigot assumes its shallowest position in the socket.
Figure 6:
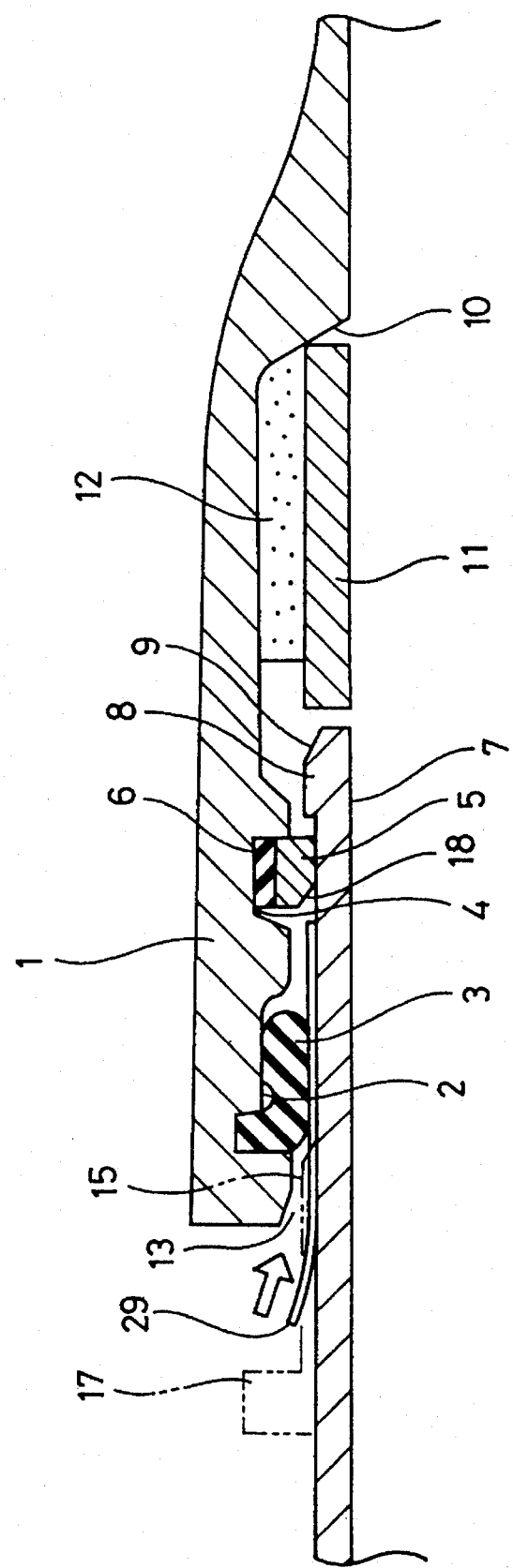
FIG. 6 is a longitudinal sectional view of the separation-preventive pipe joint for explaining an operation of disassembling the same.

As described above, a slight allowance for expansion and retraction is left between the socket 1 and the spigot 7. FIG. 4 shows a state of the joint where the spigot 7 assumes its deepest position in the socket 1, while FIG. 5 shows a state of the joint where the spigot 7 assumes its shallowest position in the socket 1. In either case, the bend-preventive projections 15 face opposite the inner periphery of the open end portion 13 of the socket 1, ensuring a bend-preventive effect. The projections 15 are tailored so as not to abut the seal packing 3 even when the spigot 7 assumes its deepest position in the socket 1 as shown in FIG. 4.

Consequently, the clearance between the outer periphery of the spigot 7 and the inner periphery of the open end portion 13 of the socket 1 is necessarily filled with the bend-preventive projections 15, thereby minimizing an allowance for bending the socket 1 and the spigot 7 relative to each other. As a result, any substantial bending of the joint is prevented even when external forces are exerted on the joint.

To disassemble the pipe joint, a thin plate 29 is driven in between the socket 1 and the spigot 7 through the clearance 16 defined between each circumferentially adjacent pair of projections 15. The thickness of the thin plate 29 is equal to or greater than the height of the projection 8 of the end portion of the spigot 7. As the thin plate 29 is driven in, the forward end thereof passes through the seal packing 3, then is guided by the tapered surface 18 of the locking ring 5, and forcibly inserted within the inner periphery of the locking ring 5. Consequently, the locking ring 5 is enlarged in diameter, thereby permitting the projection 8 to pass through the locking ring 5 and the seal packing 3 away from the socket 1. Thus, the spigot 7 can be separated from the socket 1.

Figure 7:
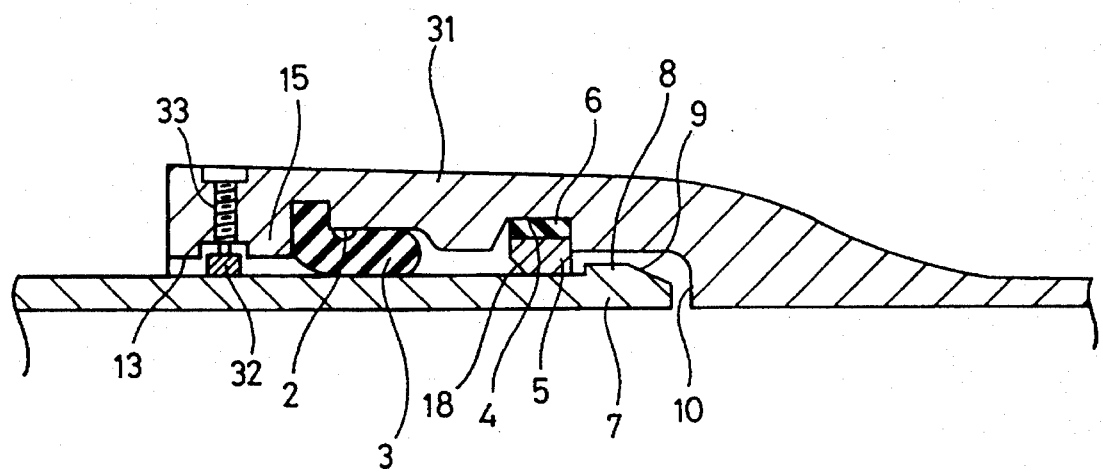
FIG. 7 is a longitudinal sectional view illustrating a separation-preventive pipe joint according to a second embodiment of the present invention.

A second embodiment of the present invention is shown in FIG. 7. FIG. 7 illustrates a pipe joint in which the aforesaid spigot 7 is joined with a socket 31 of a profile pipe. Since the socket 31 of the profile pipe requires no allowance for expansion and retraction of the pipe joint, a deeper end face 10 of the socket 31 is located in a position close to the end of the spigot 7 when the projection 8 of the spigot 7 engages the locking ring 5. Therefore, when the spigot 7 is to move toward a position in the socket 31 deeper than a position at which the projection 8 is engageable with the locking ring 5, the end of the spigot 7 abuts the deeper end face 10 to prevent the movement of the spigot 7.

A press ring 32 having one split in the circumference thereof is provided in a portion of the inner periphery of the socket 31 facing opposite the bend-preventive projection 15. The press ring 32 is pressed against the outer face of the projection 15 by means of set bolts 33 screwed into the socket 31 from the outer periphery of the socket 31 to perfectly prevent the socket 31 and the spigot 7 from bending relative to each other. The joining of the pipe joint shown in FIG. 7 is also achieved by means of the joining device 21 shown in FIG. 3.

Figure 8:
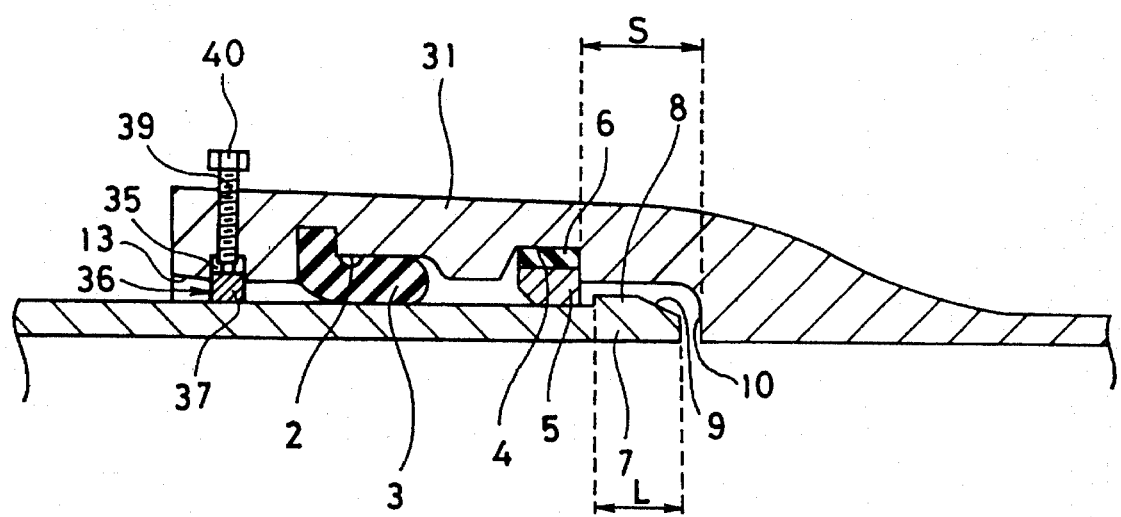
FIG. 8 is a longitudinal sectional view illustrating a separation-preventive pipe joint according to a third embodiment of the present invention.
Figure 9:
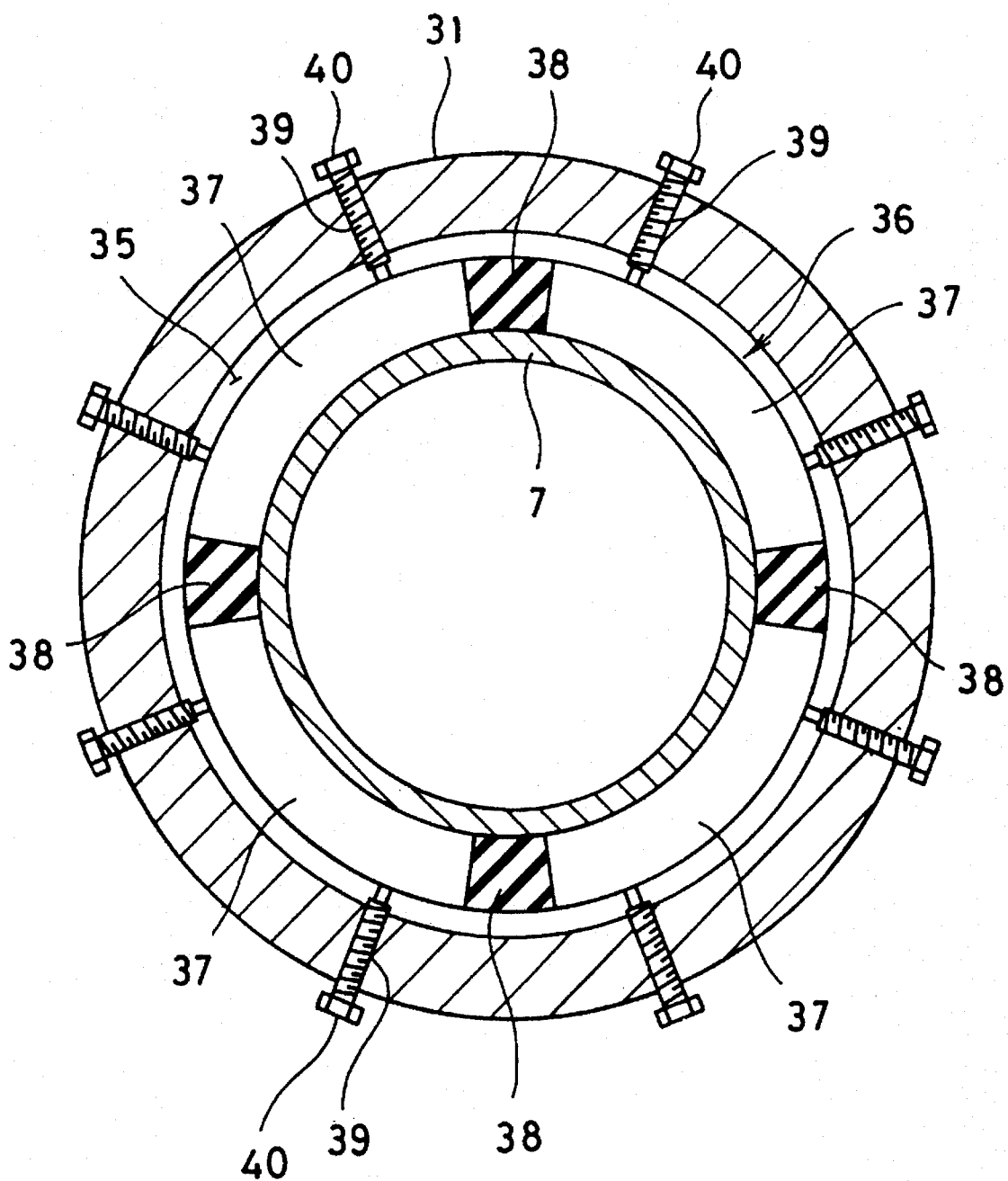
FIG. 9 is a cross sectional view of the separation-preventive pipe joint shown in FIG. 8.

A third embodiment of the present invention is shown in FIGS. 8 and 9. In the third embodiment, a straight pipe is joined with a bent pipe which is one example of a profile pipe. A socket 31 is formed in an end portion of the bent pipe, and a spigot 7 to be inserted into the socket 31 is formed in an end portion of the straight pipe. A bend-preventive ring receiving groove 35 is formed circumferentially in an inner peripheral portion of the socket 31 on a side closer to the open end thereof than a seal packing receiving groove 2. A bend-preventive ring 36 is fitted in the bend-preventive ring receiving groove 35. The bend-preventive ring 36 includes four arcuate segments 37 each having an equal length along the circumference thereof and retention members 38 each interposed between a circumferentially adjacent pair of segments 37 in a compressed state. These retention members 38 are formed of an elastic material such as rubber, and serve to prevent the segments 37 from falling out of the bend-preventive ring receiving groove 35 when the bend-preventive ring 36 is fitted in the receiving groove 35.

The socket 31 is formed with eight screw holes 39 aligning along the circumference thereof and each extending radially from an outer periphery thereof to the bottom of the bend-preventive ring receiving groove 35. Press bolts 40 are screwed into the screw holes 39 radially inwardly from the outer periphery of the socket 31. These press bolts 40 abut outer peripheral surfaces of the segments 37 to press the segments 37 against an outer periphery of the spigot 7.

Like the second embodiment shown in FIG. 7, a deeper end face 10 of the socket 31 is located in a position close to an end of the spigot 7 when a projection 8 of the spigot 7 engages a locking ring 5. More specifically, a distance S between the deeper end face 10 of the socket 31 and a locking ring receiving groove 4 is slightly greater than a length L of the projection 8. Thus, the allowance for expansion and retraction of the pipe joint is substantially eliminated.

When the socket 31 and the spigot 7 are to be joined together, the bend-preventive ring 36 is fitted into the bend-preventive ring receiving groove 35. At this time, the segments 37 are fitted into the bend-preventive ring receiving groove 35 with the retention members 38 each interposed between the circumferentially adjacent pair of segments 37, so that the segments 37 are prevented from falling out of the bend-preventive ring receiving groove 35. Thus, the bend-preventive ring 36 is assuredly fitted in the bend-preventive ring receiving groove 35.

Subsequently, the spigot 7 is inserted into the socket 31 by using the joining device 21 shown in FIG. 3. At this time, the segments 37 and the retention members 38 are pressed by the projection 8 of the spigot 7, and moved toward the outer peripheral side in the bend-preventive ring receiving groove 35, thereby enlarging the diameter of the bend-preventive ring 36. Thus, the projection 8 can pass through the bend-preventive ring 36.

After the spigot 7 is thus inserted into the socket 31, the press bolts 40 are screwed into the screw holes 39 from the outer periphery of the socket 31 to press the segments 37 against the outer periphery of the spigot 5, thereby radially securing the socket 31 to the spigot 7.

Consequently, the bending and substantial expansion and retraction between the socket 31 and the spigot 7 can be prevented. Further, the separation of the spigot 7 from the socket 31 can be assuredly prevented.

According to the third embodiment, the bend-preventive ring 36 includes four segments 37 and four retention members 38 as shown in FIG. 9. The numbers of the segments 37 and the retention members 38 may be increased or decreased depending on the diameter of a pipe to be used. Similarly, the number of the press bolts 40 is not limited to eight, but may be increased or decreased depending on the diameter of a pipe to be used.

Figure 10:
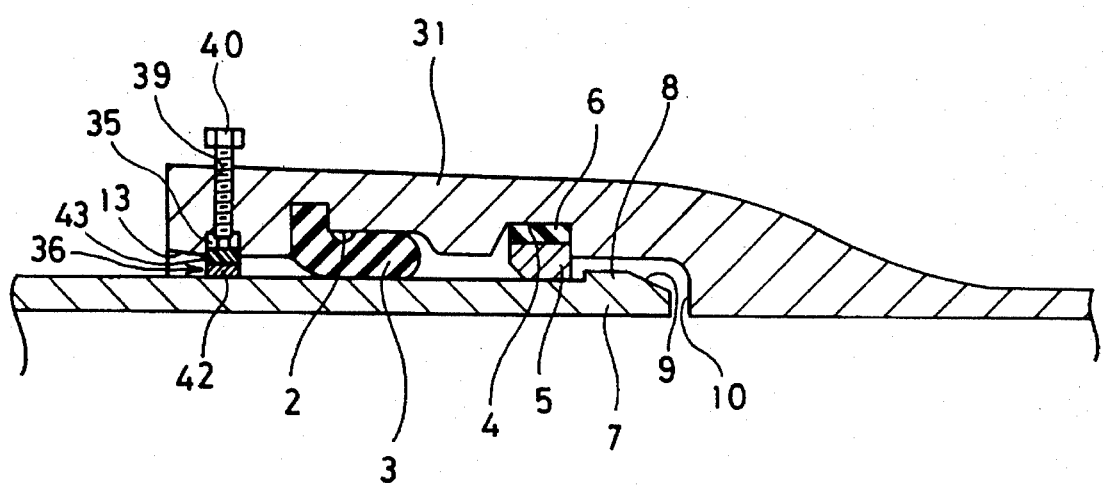
FIG. 10 is a longitudinal sectional view illustrating a separation-preventive pipe joint according to a fourth embodiment of the present invention.
Figure 11:
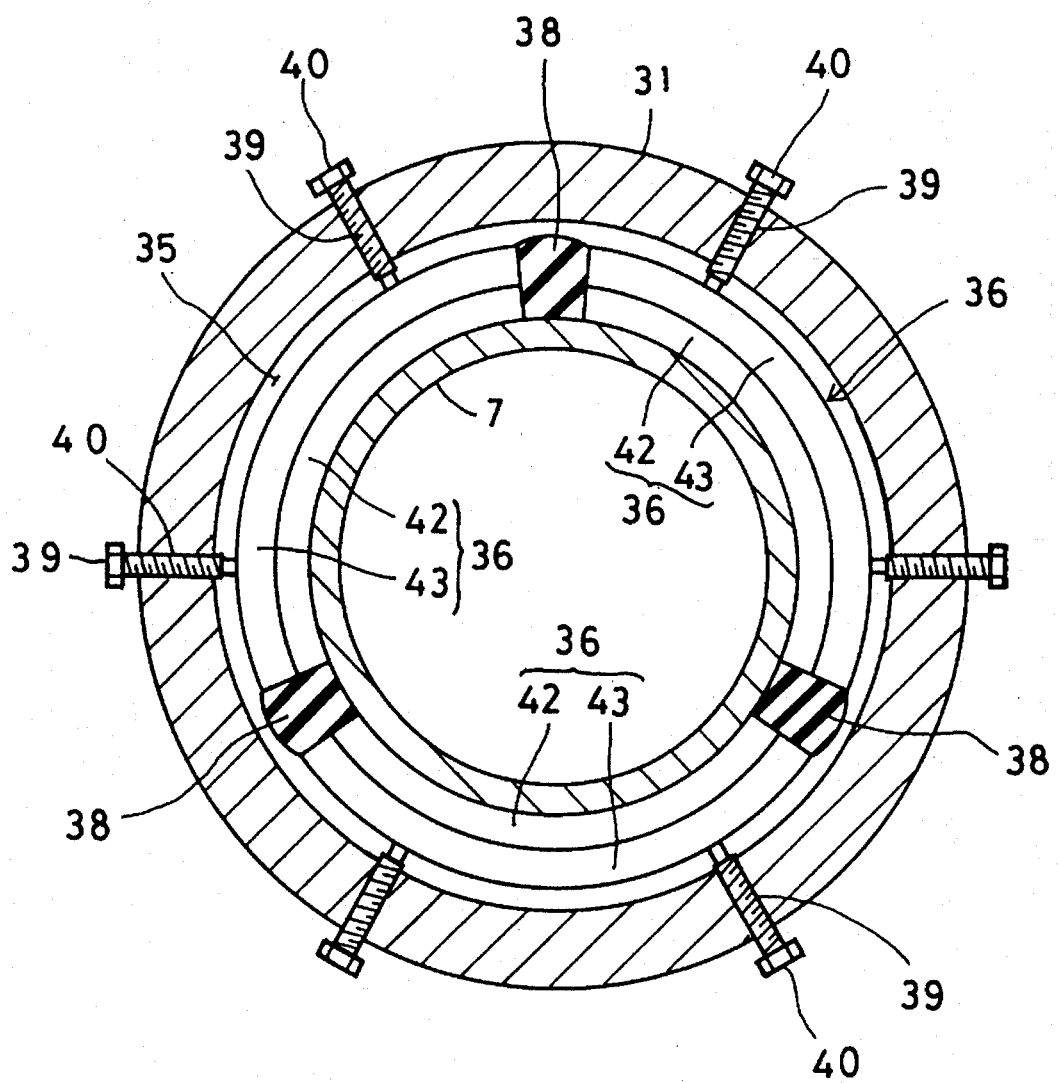
FIG. 11 is a cross sectional view of the separation-preventive pipe joint shown in FIG. 10.

A fourth embodiment of the present invention is shown in FIGS. 10 and 11. In the fourth embodiment, a bend-preventive ring 36 includes three arcuate segments 37 each having an equal length along the circumference thereof and retention members 38 made of an elastic material such as rubber. The segments 37 each include a rigid ductile cast-iron layer 42 formed on the inner peripheral side thereof and a nylon layer 43 formed of a softer material than the ductile cast-iron layer 42 on the outer peripheral side thereof.

When a bending force is applied between a socket 31 and a spigot 7 due to nonuniform forces exerted to the profile pipe, a bending moment is generated in a joint portion. At this time, the nylon layers 43 of the bend-preventive ring 36 are deformed to serve as a cushion. Thus, the moment of the bending force in the joint portion can be reduced and, at the same time, concentration of stresses on portions where ends of press bolts 40 abut an outer periphery of the bend-preventive ring 36 (or the nylon layers 43) can be alleviated. Therefore, problems such as the deformation of the spigot 7 and the exfoliation of lining formed on an inner periphery of the spigot 7 can be prevented.

The retention members 38 made of an elastic material such as rubber are very useful, as they serve to retain the segments 37 and to absorb the bending moment as described above.

The materials for the segments 37 are not limited to those described above, but may be appropriately selected so that the segments 37 each include a rigid material layer such as of a metal formed on the inner peripheral side thereof and a soft material layer formed of a softer material than the rigid material layer on the outer peripheral side thereof. Exemplary materials for the inner peripheral layer include cast-irons of other types, steels, nonferrous metals. Exemplary materials for the outer peripheral layer include rubber and plastic materials.

Figure 12:
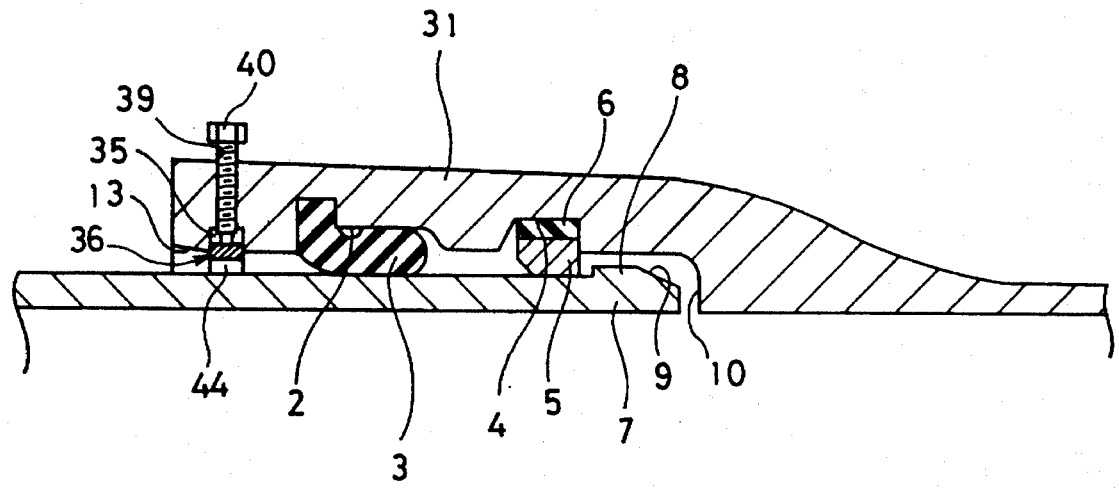
FIG. 12 is a longitudinal sectional view illustrating a separation-preventive pipe joint according to a fifth embodiment of the present invention.
Figure 13:
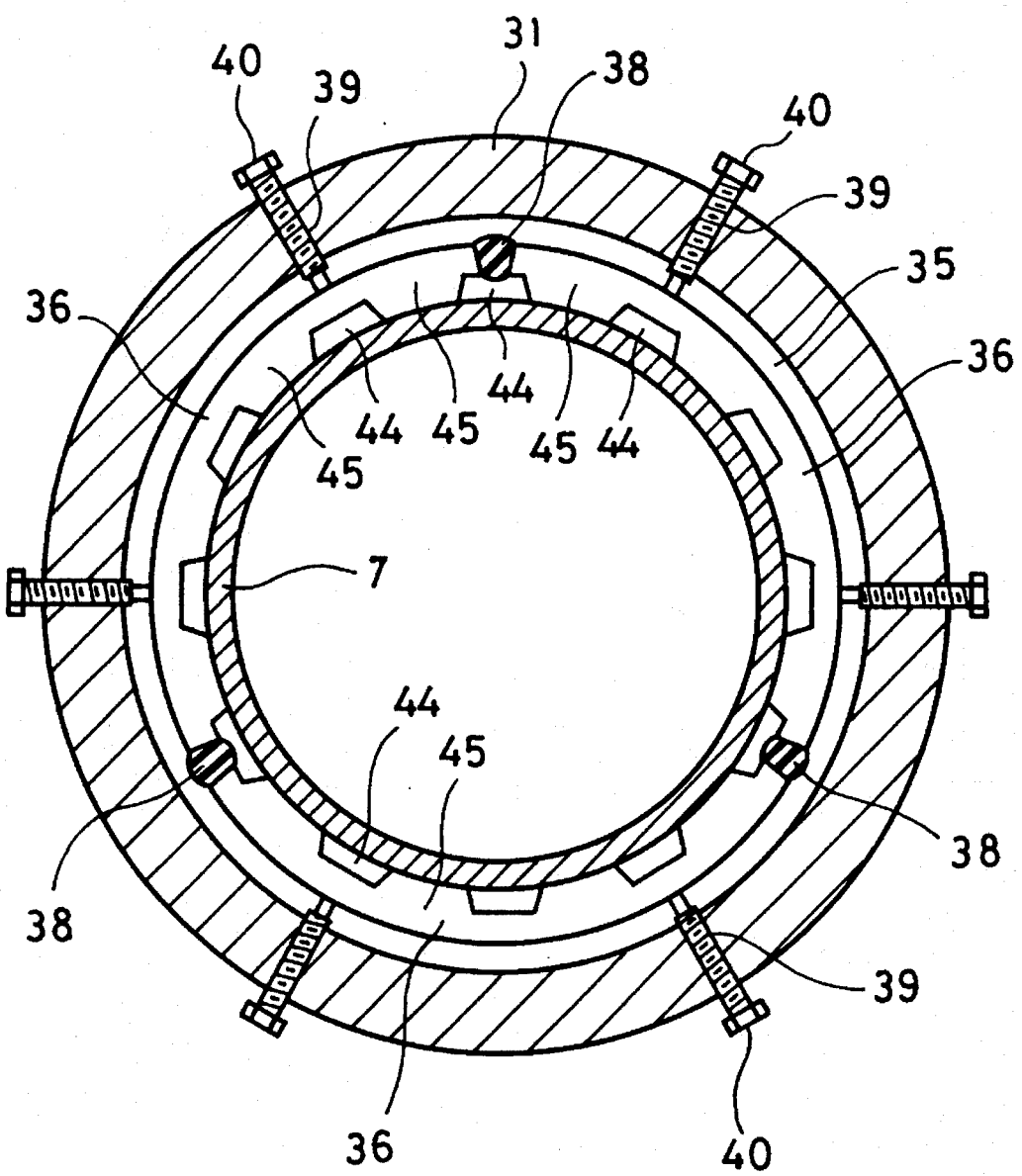
FIG. 13 is a cross sectional view of the separation-preventive pipe joint shown in FIG. 12.

A fifth embodiment is shown in FIGS. 12 and 13. In the fifth embodiment, a plurality of trapezoidal recesses 44 and projections 45 are alternately formed along the entire circumference of an inner periphery of a bend-preventive ring 36. Top surfaces of the respective projections 45 contact an outer periphery of the spigot 7. The bend-preventive ring 36 is circumferentially equally divided into three segments at the positions of the recesses 44, in which retention members 38 are provided. Press bolts 40 are located in positions corresponding to the recesses 44 of the bend-preventive ring 36. For the joining of a pipe joint, the bend-preventive ring 36 is set so that the recesses 44 are located in positions corresponding to screw holes 39 for the press bolts 40, and the positions of the retention members 38 are circumferentially offset from the positions of the screw holes 39.

When a bending force is applied between the socket 31 and the spigot 7 due to nonuniform forces exerted to the profile pipe, a bending moment is generated in a joint portion. At this time, since the press bolts 40 are located in positions corresponding to the recesses 44 of the bend-preventive ring 36, stresses generated in portions pressed by the press bolts 40 are dispersed circumferentially along the recesses 44 and, therefore, the concentration of the stresses can be alleviated. Thus, problems such as the deformation of the spigot 7 and the exfoliation of lining formed on an inner periphery of the spigot 7 can be prevented.

The configuration of the recesses 44 and the projections 45 is not limited to a trapezoidal shape as shown in FIG. 13, but each recess or projection may be formed into a rectangular or curved shape (undulation).

In other embodiments, the socket 31 or the spigot 7 may be formed in either of the straight pipe and the profile pipe. The arrangements according to the embodiments described above can be applied to joint portions between straight pipes and between profile pipes.

While only certain presently preferred embodiments of the invention have been described in detail, as will be apparent to those skilled in the art, certain changes and modifications can be made in embodiments without departing from the spirit and scope of the invention as defined by the following claims.

What is claimed is:

1. A separation-preventive pipe joint for joining a pair of pipes together, comprising:

a socket formed in an end portion of one of the pipes;

a spigot formed in an end portion of the other pipe;

a locking ring receiving groove formed in an inner periphery of the socket;

a locking ring received in the locking ring receiving groove;

a projection formed on an outer periphery of an end portion of the spigot for preventing the spigot from being separated from the socket by engaging the locking ring;

means disposed inside the socket for preventing the projection from moving toward a position in the socket deeper than a position at which the projection is engageable with the locking ring by abutting the end portion of the spigot; and bend-preventive means for preventing the spigot and the socket from bending relative to each other by filling up a clearance between an outer peripheral surface of the spigot and an inner peripheral surface of an open end portion of the socket.

2. A separation-preventive pipe joint as set forth in claim 1, wherein the bend-preventive means includes a projection formed on the outer periphery of the spigot.

3. A separation-preventive pipe joint as set forth in claim 2, further comprising:

a press ring provided on an inner peripheral portion of the socket facing opposite the projection for bend prevention; and press means for pressing the press ring against the outer face of the projection.

4. A separation-preventive pipe joint as set forth in claim 1, wherein a plurality of projections are formed on the outer periphery of the spigot along the circumference thereof.

5. A separation-preventive pipe joint as set forth in claim 4, wherein a clearance is formed between each circumferentially adjacent pair of projections, through which clearance a device for disassembling the pipe joint is inserted between the socket and the spigot.

6. A separation-preventive pipe joint as set forth in claim 1, wherein an end of the spigot is spaced a predetermined distance from a deeper end of the socket and a cylindrical sleeve for filling the distance is interposed between the end of the spigot and the deeper end of the socket.

7. A separation-preventive pipe joint as set forth in claim 1, wherein the bend-preventive means includes a ring provided on the inner periphery of the socket and press means for pressing the ring against the outer periphery of the spigot.

8. A separation-preventive pipe joint as set forth in claim 7, wherein the press means includes a bolt to be screwed into the socket radially from the outer periphery to the inner periphery of the socket.

9. A separation-preventive pipe joint as set forth in claim 7, wherein the ring is circumferentially divided into plural pieces.

10. A separation-preventive pipe joint as set forth in claim 9, wherein the ring includes a plurality of segments and elastic retention members each interposed between a circumferentially adjacent pair of segments in a compressed state.

11. A separation-preventive pipe joint as set forth in claim 7, wherein the ring includes a rigid material layer formed of a rigid material on an inner peripheral side thereof and a soft material layer formed of a softer material than the rigid material on an outer peripheral side thereof.

12. A separation-preventive pipe joint as set forth in claim 7, wherein the ring includes a plurality of recesses and projections which are alternately formed along the circumference thereof in an inner peripheral portion thereof.

13. A separation-preventive pipe joint as set forth in claim 12, wherein the press means includes bolts to be screwed radially from the outer periphery to the inner periphery of the socket into positions of the socket corresponding to the recesses of the ring.

* * * * *